United States Patent
Hulsebosch

[11] Patent Number: 5,805,982
[45] Date of Patent: Sep. 8, 1998

[54] METHOD AND APPARATUS FOR MEASURING IDLE CHANNEL QUALITY IN AN RF FREQUENCY SHARING ENVIRONMENT

[75] Inventor: Thomas G. Hulsebosch, Palatine, Ill.

[73] Assignee: Motorola, Inc., Schaumburg, Ill.

[21] Appl. No.: 508,657

[22] Filed: Jul. 28, 1995

[51] Int. Cl.$^6$ ................................................ H04B 17/00
[52] U.S. Cl. .................... 455/62; 455/466; 455/516; 455/528; 455/67.1
[58] Field of Search .......................... 455/62, 67.1, 67.3, 455/34.1, 34.2, 33.1, 56.1, 58.1, 58.2, 226.1, 423, 455, 466, 509, 512, 513, 516, 437, 528; 379/58

[56] References Cited

U.S. PATENT DOCUMENTS

| | | | |
|---|---|---|---|
| 4,197,500 | 4/1980 | Klein et al. | 455/62 |
| 4,736,453 | 4/1988 | Schloemer | 455/62 X |
| 5,203,010 | 4/1993 | Felix et al. | 455/33.2 |
| 5,203,012 | 4/1993 | Patsiokas et al. | 455/62 X |
| 5,239,676 | 8/1993 | Strawczynski et al. | 455/62 X |
| 5,280,630 | 1/1994 | Wang | 456/62 X |
| 5,285,447 | 2/1994 | Hulsebosch | 455/437 X |
| 5,408,684 | 4/1995 | Yunoki et al. | 455/62 X |
| 5,528,664 | 6/1996 | Slekys et al. | 455/466 X |
| 5,613,206 | 3/1997 | Bantz et al. | 455/58.2 X |

OTHER PUBLICATIONS

European Telecommunications Standards Institute, Apr. 1993, GSM 05.08, Version: 4.5.0, 29 pages.
European Telecommunications Standards Institute, 2 Apr. 1993, GSM 08.08, Version 4.3.0, 3 pages.

*Primary Examiner*—Reinhard J. Eisenzopf
*Assistant Examiner*—Philip J. Sobutka
*Attorney, Agent, or Firm*—Kenneth A. Haas

[57] ABSTRACT

A method of measuring idle channel quality which includes the steps of performing a first signal quality measurement (200), comparing the measurement to a threshold (202), and keying the channel (204) in response to the comparison (202) when the signal quality measurement exceeds the threshold. An apparatus for measuring idle channel quality comprising an antenna (116), a transmitter (110) coupled to the antenna (116), a receiver (110) in communication with the antenna (116), an idle channel measurement unit (112), and a channel allocator (102) in communication with the receiver and the transmitter (110). The channel allocator (102) receives channel measurements from the channel measurement unit (112) and keys an idle channel in response to a comparison between the channel measurements and a threshold when the signal quality measurement exceeds the threshold. In response to the keying, a CDPD system (14) stops transmitting on the channel.

8 Claims, 2 Drawing Sheets

METHOD AND APPARATUS FOR MEASURING IDLE CHANNEL QUALITY IN AN RF FREQUENCY SHARING ENVIRONMENT

FIELD OF THE INVENTION

The present invention relates generally to radio frequency (RF) systems, and in particular to idle channel quality measurements in radio frequency systems.

BACKGROUND OF THE INVENTION

Conventional cellular communications systems, such as advanced mobile phone service (AMPS) cellular systems, typically measure idle channel quality and perform channel prioritization or other processing based on the measured idle channel quality. A conventional method of measuring idle channel quality is to measure a channel's received signal strength when the channel is idle, i.e. no call is on the channel. If a channel has an unacceptable measured idle channel quality, the communication system may take the channel out of service or may take other corrective action. Unacceptable measured idle channel quality is typically indicative of too much interference on the channel. Although the current method of measuring idle channel quality generally produces a reliable measurement, the current method has the disadvantage of producing erratic and unreliable results when used with other systems such as Cellular Digital Packet Data (CDPD) systems.

CDPD systems have the capability of using idle or unused time on RF channels to perform other useful communications, such as packet data communications. In order for the CDPD system to take advantage of the idle time on RF channels, the CDPD system hops from channel to channel. This CDPD capability is quite desirable since otherwise idle or unusable channel bandwidth is used by CDPD in a productive manner. However, the hopping of the CDPD stream can cause problems with taking idle channel quality measurements. Specifically, if a mobile station in the CDPD network is transmitting on an idle channel during the idle channel measurement, measuring equipment for the RF channel may incorrectly conclude that there is a large amount of interference on the idle channel.

One approach to solving this problem would be to integrate the AMPS and CDPD systems under a single channel management controller that would coordinate the idle channel measurements and the CDPD transmissions. However, the CDPD specification requires a CDPD overlay over any existing AMPS system. Thus, the CDPD systems now being deployed are independent of the supporting analog AMPS cellular system. Accordingly, there is a need for a method and apparatus for performing idle channel quality measurements in the presence of a CDPD overlay system.

SUMMARY OF THE INVENTION

The present invention addresses this need by providing a method and apparatus for measuring idle channel quality in a radio frequency (RF) system. The method of measuring idle channel quality includes the steps of performing a first signal quality measurement of a channel in the RF system, comparing the first signal quality measurement to a threshold, and keying the channel when the first signal quality measurement exceeds the threshold.

According to one aspect of the present invention, the apparatus for performing idle channel measurements includes an antenna, a transmitter coupled to the antenna, a receiver in communication with the antenna, an idle channel measurement unit, and a channel allocator in communication with the idle channel measurement unit and the transmitter. The channel allocator receives channel measurements from the channel measurement unit and keys an idle channel in response to a comparison between the channel measurements and a threshold when the channel measurement exceeds the threshold.

The invention itself, together with its attendant advantages, will best be understood by reference to the following detailed description, taken in conjunction with the accompanying drawings.

DETAILED DESCRIPTION OF THE PREFERRED EMBODIMENTS

Figure 1:
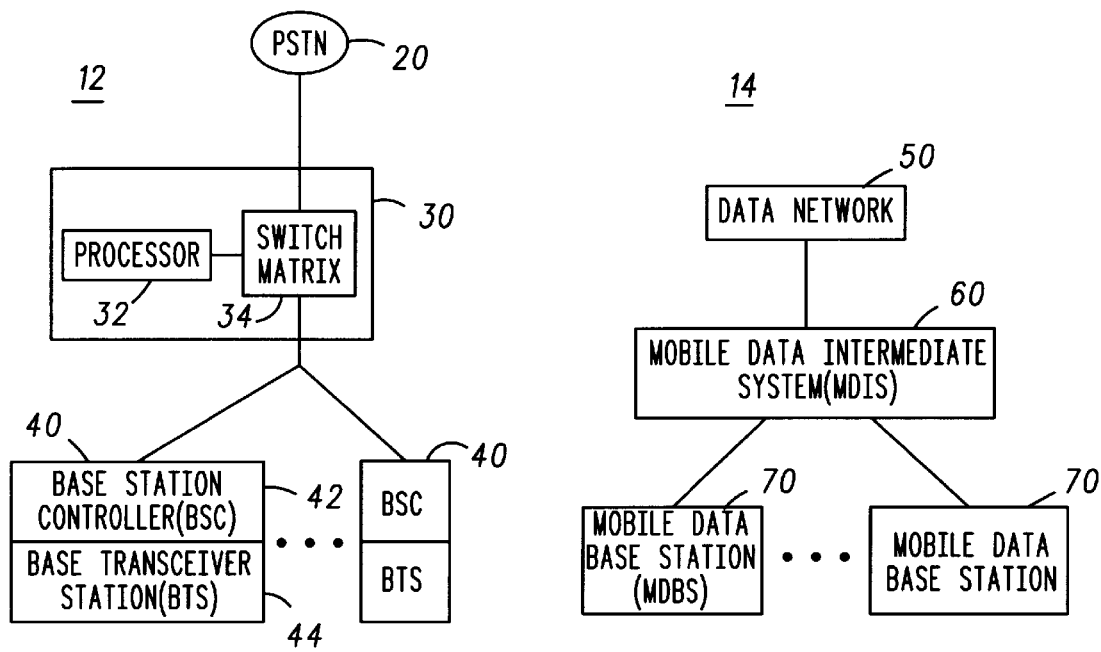
FIG. 1 is a block diagram of a preferred embodiment of a radiotelephone system with a CDPD overlay system.

FIG. 1 shows a radiotelephone system 12 in conjunction with a cellular digital packet data (CDPD) overlay system 14. The radiotelephone system 12 includes a switch 30 interfacing to the public switched telephone network (PSTN) 20 and interfacing to a plurality of base stations 40. The switch 30 includes a switch matrix 34 and a processor 32. An example of a suitable switch 30 is Motorola's EMX® 2500. The base stations 40 each include a base station controller 42 and at least one base transceiver station 44. Each of the base transceiver stations 44 communicate with a subscriber over a standard air interface such as that defined by Electronic Industries Association (EIA) Interim Standard (IS)-54 available from EIA at 2001 E. Street, N.W., Washington, D.C. 20006. A preferred base station 40 is a Motorola HDII or SC™ 9600 base station.

CDPD system 14 includes a data network 50, a mobile data intermediate system (MDIS) 60, and a plurality of mobile data base stations (MDBS) 70 connected to MDIS 60. Each MDBS 70 communicates with a data subscriber over a standardized CDPD air interface as defined in the CDPD specification version 1.1 which is available from the CDPD Forum at 401 North Michigan Avenue, Chicago, Ill. 60611. Both the base stations 40 and the MDBS 70 transmit over the same set of frequencies to their respective subscribers. To avoid interface, MDBS 70 only transmits data, preferably sending short packet bursts when none of the base stations 40 are transmitting over the same channel to a mobile subscriber. In this manner CDPD system 14 is able to use spare bandwidth within idle channels of radiotelephone system 12.

Figure 2:
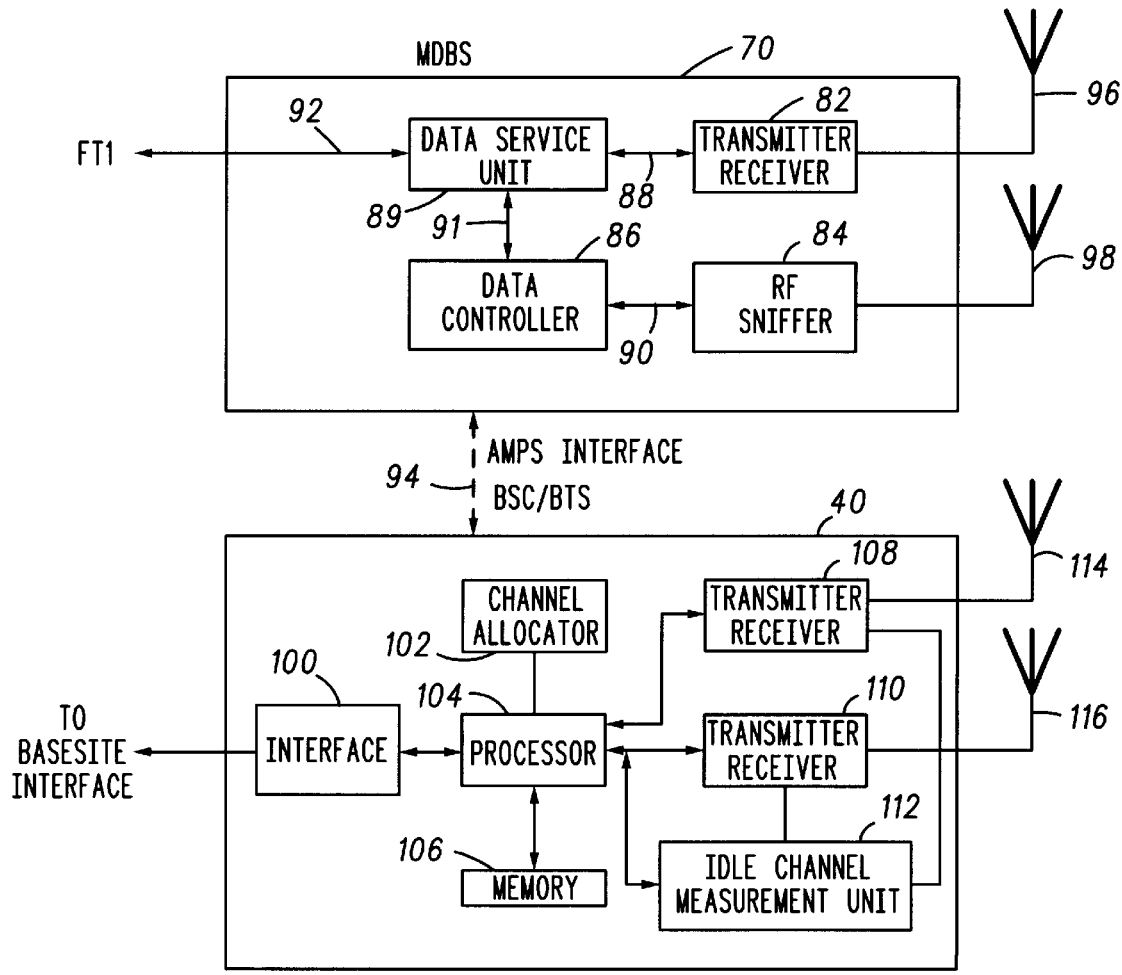
FIG. 2 is a block diagram of the base station and mobile data base station of FIG. 1.

FIG. 2. shows a more detailed diagram of MDBS 70 and base station 40. MDBS 70 includes a data service unit 80, a data controller 86, a transmitter/receiver 82, and a radio frequency (RF) sniffer 84. MDBS 70 also has a first antenna 96 and a second antenna 98. The transmitter and receiver unit 82 is connected to the first antenna 96, and RF sniffer 84 is connected to the second antenna 98. The data service unit 80 is connected via a first interface 88 to the transmitter and receiver unit 82. The data controller 86 is connected via a second interface 90 to the RF sniffer 84 and is connected to the data service unit 80 via a third interface 91. The data service unit 80 is connected to the MDIS 60 preferably using a fractional T1 connection or span line 92.

During operation, transmitter and receiver unit 82 communicates via antenna 96 with a data subscriber over the standard CDPD air interface. Data received from the receiver 82 is passed over the first interface 88 to the data service unit 80 and is in turn passed on to the MDIS 60 via the span line 92. The received data is then further passed on to the data network 50 to a fixed end customer unit. Likewise, data originated from the data network may be transmitted by transmitter 82 over the CDPD air interface to the mobile data subscriber.

In order to avoid interference with base station 40, RF sniffer 84 detects, via the antenna 98, keying by a base station transmitter 108 of the base station 40 on a particular channel. When the transmission of the base station 40 is detected by the RF sniffer 84, a signal is sent over the second interface 90 to data controller 86. Data controller 86 informs the data service unit 80 which in turn sends a message over the first interface 88 to the transmitter 82 to stop transmitting over the current channel if the channels are the same. In this manner, the MDBS 70 avoids transmitting at the same time over the same channel as base station 40.

Base station 40 includes a base site interface 100, a channel allocator 102 within a processor 104, and a memory 106. The base station 40 also includes a first transmitter and receiver unit 108, a second transmitter receiver unit 110, and an idle channel measurement unit 112. The transmitter and receiver units 108 and 110 are each connected to the idle channel measurement unit 112. The processor 104, preferably a Motorola brand 68302™ processor, is connected to the memory 106, the interface 100 and the transmitter and receiver units 108 and 110. A preferred embodiment of a method of performing channel allocation within the channel allocator 102 using transmitter and receiver units 108 and 110 and the idle channel measurement unit 112 will now be described.

Figure 3:
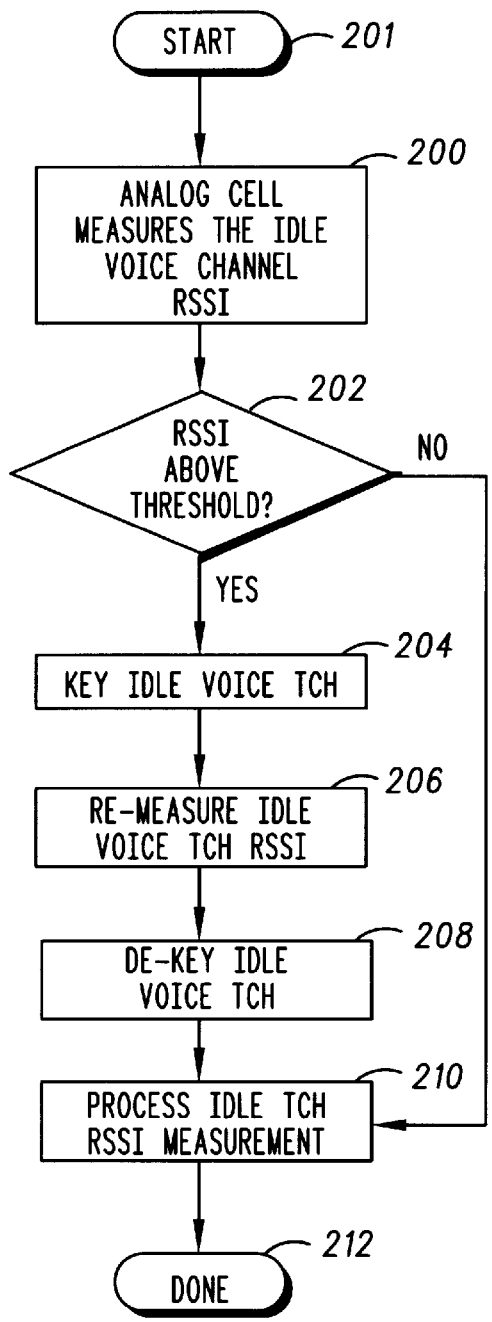
FIG. 3 is a flow chart illustrating a preferred embodiment of a method of performing idle channel measurements in the channel allocator of FIG. 2.

Referring to FIG. 3., the idle channel measurement unit 112 measures the idle channel quality, starting at step 201 and takes a receive signal strength indicator (RSSI), or other appropriate signal quality, measurement at step 200. Next, at decision step 202, the idle channel measurement is compared against a threshold value by the channel allocator 102.

Before the comparison is made the idle channel measurement is first filtered. The preferred process for filtering the idle measurement and doing the threshold comparison has two steps. The first step is to compare a number of consecutive idle channel measurements against the threshold. The second step is to determine if a predetermined number of the consecutive measurements exceed the threshold. Although a particular type of filter function that can be performed on the idle channel measurements has been described above, there are a number of different filtering functions that could also be used. Such functions include a rolling average/peak detection of past measurement function that compares the output of the average/peak function against the threshold and a block average or peak detection of the consecutive measurement function.

If the RSSI measurement is above the threshold, then base station 40 keys the idle voice channel using the transmitter 108, at step 204; re-measures the idle channel quality, at 206; and de-keys the idle voice channel, at 208. Those skilled in the art will understand that an idle voice channel is keyed by transmitting a detectable signal, preferably an amplified RF carrier and information signal, over the channel using the transmitter 108 and the antenna 114.

By keying the channel, RF sniffer 84 detects transmission and MDBS 70 is directed to stop transmitting over the channel. Therefore, the re-measured idle channel quality is a more accurate measurement.

Finally, processor 104 and channel allocator 102 processes the second idle channel measurement received from the measurement unit 112. Processing is then ended at step 212. With respect to step 202, if the measured RSSI value is not above the threshold then normal processing at step 210 is performed.

Referring again to FIG. 2., in an alternative preferred embodiment, an AMPS interface 94 is provided connecting the base station 40 with the MDBS 70. This AMPS interface 94 allows the base station 40 to inform the MDBS 70 when the base station 40 will be transmitting. The MDBS 70 upon receipt of a message over the interface 94 from the base station 40, will stop transmitting over the channel to be used by the base station 40.

The above described method of performing channel allocation using idle channel measurement has many benefits. One benefit is that usage of faulty measurement data due to a foreign carrier, such as a CDPD system 14, is reduced by the base station 40 in determining the quality of the measured channel. Reducing usage of faulty idle channel measurement data improves idle channel measurement accuracy and thereby improves overall system performance of the radiotelephone system 12. By comparing the RSSI measurement with a threshold value, the preferred embodiment determines when faulty measurement data has likely been received. In this manner, the base station 40 advantageously provides more accurate idle channel measurements in the presence of a CDPD system 14. The base station 40 then performs channel prioritization based on the more accurate measurement data and chooses an appropriate channel for transmission.

Figure 4:
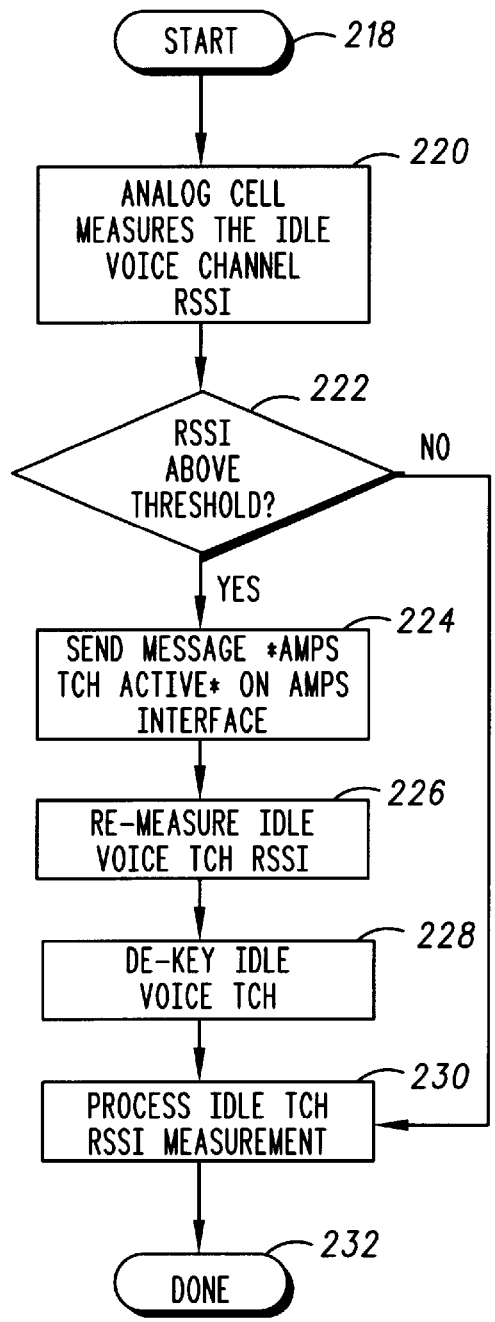
FIG. 4 is a flow chart illustrating another preferred embodiment of a method of performing idle channel measurements in the channel allocator of FIG. 2.

Referring now to FIG. 4., a preferred method of performing idle channel measurements within channel allocator 102 in the preferred embodiment using the AMPS interface 94 is illustrated, Beginning at step 218, the analog cell or base station 40 measures the idle voice channel, preferably using a received strength indicator (RSSI) by the channel allocator 102, at step 220. Next, at 222, the RSSI measurement is compared to a threshold.

Before the comparison at 222 is made the idle channel measurement is first filtered. The preferred process for filtering the idle measurement and doing the threshold comparison has two steps. The first step is to compare a number of consecutive idle channel measurements against the threshold. The second step is to determine if a predetermined number of the consecutive measurements exceed the threshold.

Although the preferred method described a particular type of filter function that can be performed on the idle channel measurements, there are a number of different filtering functions that could also be used, such as the rolling average/peak detection and block average or peak detection functions described in reference to FIG. 3.

If the RSSI is not above the threshold then normal idle channel processing known to those of ordinary skill is conducted at step 230. However, if the RSSI measurement exceeds the threshold then base station 40 sends a message over the AMPS interface 94 informing the MDBS 70 that the AMPS traffic channel is active. Next, at step 226, base station 40 re-measures the idle voice channel RSSI. The base station 40 then sends another message to the MDBS 70 via the AMPS interface 94 that the AMPS traffic channel is idle at step 228. Finally the idle traffic channel RSSI measurement is processed at step 230. Such processing includes idle channel prioritization techniques. One prioritization technique involves classifying each channel based on the idle channel measurement into either an active or inactive category. Then, only channels in the active category are selected for use. Other prioritization techniques are known to those of ordinary skill. Processing is completed at step 232.

A preferred embodiment with an AMPS interface 94 has the additional advantage of directly transmitting information from the base station 40 to the MDBS 70. In this embodiment there is no need to key and de-key the channel or to use the RF sniffer 84 to detect such keying, because the base station 40 can send a message directly to the MDBS 70 informing the MDBS 70 to stop transmitting over the idle channel.

Although each of the preferred embodiments described herein have referred to the channel allocator 102 being disposed in the base station 40, those skilled in the art will appreciate that the channel allocator 102 may alternatively be placed in the processor 32 within the switch 30. In this alternative configuration, the idle channel measurements within the base station 40 would be transmitted to the switch 30 over the interface connecting the switch 30 to the base station 40. Also, those skilled in the art will appreciate that although the antenna 98 connected to the RF sniffer 84 is illustrated as being a separate antenna from the antennas 114, 116 used by the base station 40, the RF sniffer 84 could alternatively be connected to the same antennas used by the base station 40. In addition, the data service unit 80 and data controller 86 within the MDBS 70 could also be implemented within the base station 40 where the transmitter and receiver unit 82 would be substituted for one of the base station transmitter/receivers 108, 110. Such a configuration would provide cost savings due to the reuse of many system components although the processor 104 programming complexity would increase.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method of measuring idle channel quality in an RF frequency sharing environment the system comprising a first and a second communication system each capable of using common radio frequency channels, the method being performed by the first system and comprising the steps of:

performing a first signal quality measurement of a channel in the first RF system;

comparing the first signal quality measurement to a threshold;

keying the channel when the first signal quality measurement exceeds the threshold causing the second communication system to cease transmitting on the channel; and performing a second signal quality measurement of the channel after the step of keying.

2. The method of claim 1, wherein said keying step comprises transmitting a detectable RF signal over the channel.

3. The method of claim 1, further comprising performing a second signal quality measurement on the channel after keying the channel.

4. The method of claim 3, further comprising the step of de-keying the channel after performing the second signal quality measurement.

5. A method of measuring idle channel quality in a communication system having a radiotelephone station and a cellular digital packet data station each capable of using common radio frequency channels, the method comprising the steps of:

measuring, at the radiotelephone station, a signal quality of a first RF channel;

comparing said signal quality of said first RF channel to a threshold;

directing said CDPD station to cease transmitting on said RF channel if said CDPD station is transmitting on said channel and said signal quality exceeds said threshold; and measuring, at said radiotelephone station, said signal quality of said first RF channel.

6. An apparatus for measuring idle channel quality within an RF frequency sharing environment comprising a first and a second communication system each capable of using common radio frequency channels, the apparatus being part of the first system and comprising:

an antenna;

a transmitter in communication with the antenna;

a receiver in communication with the antenna; and a channel allocator in communication with a channel measurement unit and the transmitter, said channel allocator receiving a channel measurement from the channel measurement unit and instructing the transmitter to key an idle channel in response to a comparison between the channel measurements and a threshold when the channel measurement exceeds the threshold causing the second communication system to cease transmitting on the channel and the channel measurement unit performs a second idle channel measurement after the channel allocator has keyed the idle channel.

7. The apparatus of claim 6, wherein said communication unit comprises a base station in a wireless communication system and said channel allocator instructs the transmitter to key the channel by transmitting a detectable radio frequency signal over the antenna.

8. The apparatus of claim 6, further comprising a switch matrix in communication with the channel allocator.

* * * * *